UNITED STATES PATENT OFFICE.

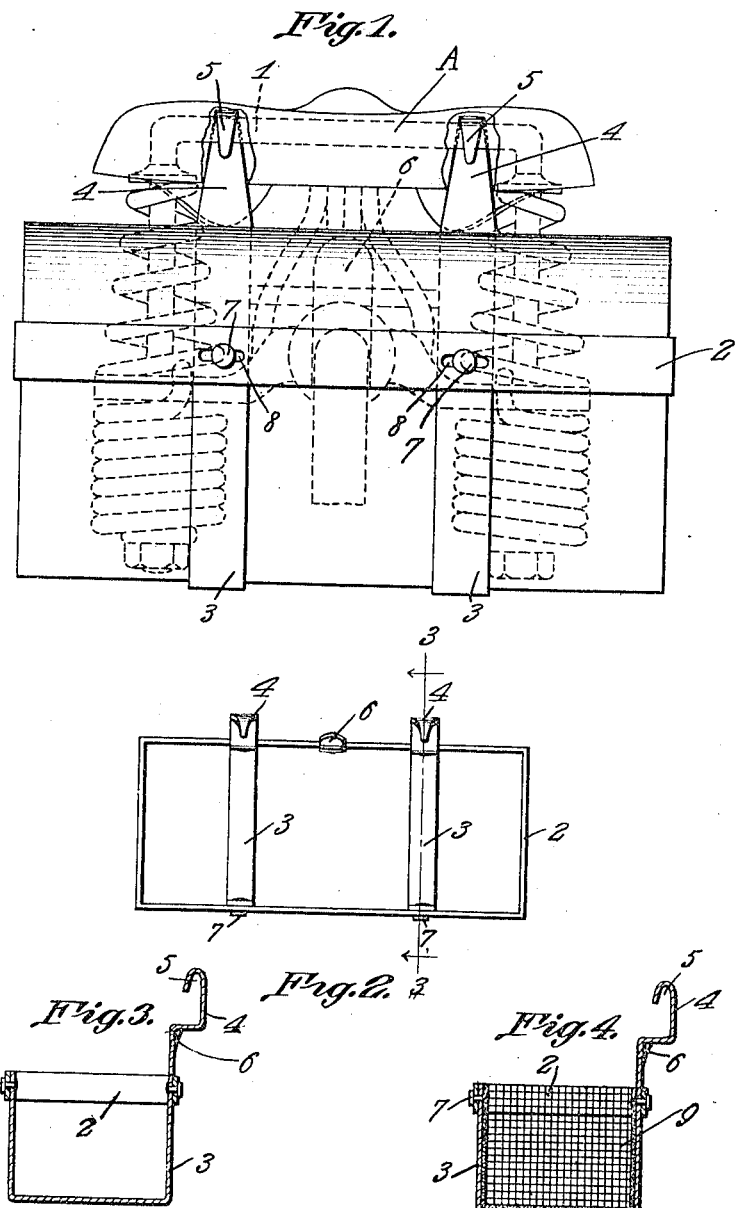

GEORGE WILKENS, OF SUCCASUNNA, NEW JERSEY.

DETACHABLE BRACKET.

1,261,664.  Specification of Letters Patent.  Patented Apr. 2, 1918.

Application filed December 18, 1916. Serial No. 137,642.

*To all whom it may concern:*

Be it known that I, GEORGE WILKENS, a citizen of the United States, residing at Succasunna, in the county of Morris and State of New Jersey, have invented certain new and useful Improvements in Detachable Brackets, of which the following is a specification.

This invention relates to a detachable bracket and more particularly to a device for use in carrying a lunch box or other similar container suspended from the rear of a bicycle or motorcycle seat.

The primary object of the invention is to provide a bracket in the form of a carrier constructed to be attached to and suspended from the ordinary spring bar generally employed in the construction of bicycle seats and saddles.

A further object of the invention is to provide a device of this character constructed to eliminate unnecessary vibration so that the contents of the lunch box mounted in the carrier will not be disturbed or injured while the bicycle is being propelled over rough ground.

A further object of this invention is the provision of a detachable bracket which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a rear elevation showing the device carrying a lunch box and attached at the rear of a bicycle saddle.

Fig. 2 is a top plan view of the bracket or carrier.

Fig. 3 is a section on the line 3—3 of Fig. 2.

Fig. 4 is a similar view showing the addition of a foraminous basket supported by the bracket.

The usual bicycle saddle A is provided with a structure designed to support the leather seat and this structure includes coil springs which resiliently support a crossbar 1 clearly shown in dotted lines in Fig. 1 of the drawing.

The bracket or carrier comprises a rectangular retaining band 2 shaped to surround the ordinary square lunch box. It is to be understood, of course, that this retaining band may be of any desired configuration since the device may be used equally as well with cylindrical dinner pails or other containers of various designs. Supporting yokes 3 are constructed from the same material as that from which the band 2 is formed and the yokes are U-shaped as clearly shown by Figs. 3 and 4 of the drawing thereby giving the required depth to the carrier. The terminals of the yokes 3 are fastened to the longitudinal side portions of the retaining band 2. The rear vertical portion of each yoke, however, is extended above the corresponding side portion of the band to provide a hanger 4 for each yoke. This portion, which constitutes the hanger, is bent rearwardly at right angles and again upwardly to extend vertically and has its terminal provided with a hook 5. This right angularly rearwardly extending portion of the hanger permits the hooks 5 to be extended beneath the rear of the saddle and attached to the bar 1 of the saddle structure. The hangers will thereby suspend the carrier at the rear of the saddle and slightly below the same.

Fastened to the rear longitudinal side of the retaining band 2 is a spring clip 6 which is constructed from a short piece of material having one end fastened to the retaining band and its free end slightly curved rearwardly for engaging the saddle structure thereby insuring the bracket against accidental displacement. This spring clip also serves to absorb some of the vibration that occurs while the bicycle is in motion, but it is particularly pointed out that the resiliency of the springs employed in this type of saddle will greatly aid in absorbing the vibration which might otherwise be transmitted to the bracket.

For permitting longitudinal adjustment of the hangers, I have provided the terminals of the U-shaped yokes with fastening rivets 7 which project through elongated slots 8 formed in each longitudinal side of the band 2. It will be obvious that these yokes may be moved toward or away from each other thereby permitting the hangers to also be adjusted to different types of saddles.

As shown by Fig. 4 of the drawing, the bracket supports a basket 9 constructed from suitable foraminous material, this basket being employed for carrying small articles or bundles when the lunch box is not in use.

From the foregoing it will be observed that a very simple and durable detachable bracket has been provided, the details of which embody the preferred form, I desire it to be understood however, that slight changes in the minor details of construction may be made without departing from the spirit of the invention or the scope of the claim hereunto appended.

I claim:

A device of the character described comprising a rectangular retaining band having its longitudinal sides provided with elongated slots, supporting yokes arranged independently in longitudinal spaced relation and having portions depending from the said rectangular band, each yoke being provided with fastening elements received in the said slots, the forward ends of the yoke being extended upwardly above the band and bent at right angles, a spring clip comprising a relatively short piece of material having one end fastened to the retaining band midway between the upwardly extended portions of the yoke and having its free end curved rearwardly and terminating in a plane immediately below the right angularly disposed portions, and hooks extending upwardly from the said right angularly disposed portions.

In testimony whereof I affix my signature in presence of two witnesses.

GEORGE WILKENS.

Witnesses:
N. SAIROS,
A. J. CRATER.

Copies of this patent may be obtained for five cents each, by addressing the "Commissioner of Patents, Washington, D. C."